US008128150B2

(12) United States Patent
Kamiya

(10) Patent No.: US 8,128,150 B2

(45) Date of Patent: Mar. 6, 2012

(54) UNDERRUN PREVENTION MEMBER FOR VEHICLE BUMPER BEAM

(75) Inventor: Keisuke Kamiya, Toyota (JP)

(73) Assignee: Toyoda Iron Works Co., Ltd., Toyota (JP)

( * ) Notice: Subject to any disclaimer, the term of this patent is extended or adjusted under 35 U.S.C. 154(b) by 0 days.

(21) Appl. No.: 13/008,391

(22) Filed: Jan. 18, 2011

(65) Prior Publication Data

US 2011/0175380 A1 Jul. 21, 2011

(30) Foreign Application Priority Data

Jan. 19, 2010 (JP) ................................ 2010-009506

(51) Int. Cl.
*B60R 19/04* (2006.01)

(52) U.S. Cl. ......................... 296/102; 293/120; 293/143

(58) Field of Classification Search .................. 293/102, 293/120, 143, 144, 146, 148, 142, 122, 115
See application file for complete search history.

(56) References Cited

U.S. PATENT DOCUMENTS 5,560,662 A * 10/1996 Apgar et al. ................. 293/121
7,510,232 B2 * 3/2009 Fortin ........................... 293/143
7,533,912 B2 * 5/2009 Frederick et al. ............. 293/120
2010/0001540 A1 * 1/2010 Barcomb et al. .............. 293/155

FOREIGN PATENT DOCUMENTS

JP A 2003-252134 9/2003
JP A 2009-1199 1/2009

* cited by examiner

*Primary Examiner* — Joseph Pape
(74) *Attorney, Agent, or Firm* — Oliff & Berridge, PLC

(57) ABSTRACT

An underrun prevention member for a vehicle bumper beam including a substantially vertical outer side wall faced an area outside the vehicle and a horizontal wall provided so as to be extended substantially horizontally from an end of the outer side wall in a top-bottom direction toward an inside of the vehicle, disposed at a front portion or a rear portion of the vehicle so as to be extended substantially horizontally in a vehicle widthwise direction, and integrally fixed to the bumper beam so as to protrude in the top-bottom direction beyond the horizontal wall to prevent an underrun of the bumper beam under an object outside the vehicle or the object outside the vehicle under the bumper beam.

4 Claims, 4 Drawing Sheets

UNDERRUN PREVENTION MEMBER FOR VEHICLE BUMPER BEAM

INCORPORATION BY REFERENCE

The disclosure of Japanese Patent Application No. 2010-009506 filed on Jan. 19, 2010 including the specification, drawings and abstract is incorporated herein by reference in its entirety.

BACKGROUND OF THE INVENTION

1. Field of the Invention

The invention relates to a vehicle bumper beam and, more particularly, to an underrun prevention member that prevents occurrence of a situation where a bumper beam underruns a collision object or the collision object underruns the bumper beam to damage a vehicle component, such as a radiator.

2. Description of the Related Art

A bumper beam (also called bumper reinforcement) is widely used. The bumper beam is disposed at the front portion or the rear portion of a vehicle so as to extend substantially horizontally in a vehicle widthwise direction. The bumper beam may underrun a collision object or a collision object may underrun the bumper beam to damage a vehicle component, such as a radiator. To prevent occurrence of this situation, a technology, in which an underrun prevention member that protrudes upward or downward beyond a bumper beam is integrally fixed to the bumper beam, has been devised. A device described in Japanese Patent Application Publication No. 2009-1199 (JP-A-2009-1199) is an example of the underrun prevention member. The underrun prevention member includes (a) a bottom wall that is fixed to an upper portion of a bumper beam; (b) an underrun prevention wall that stands on the bottom wall; (c) a first reinforcement side wall that is connected to one end of the underrun prevention wall and one end of the bottom wall; and (d) a second reinforcement side wall that is provided in parallel with the first reinforcement side wall, and that is connected to the other end of the underrun prevention wall and the other end of the bottom wall. In addition, Japanese Patent Application Publication No. 2003-252134 (JP-A-2003-252134) describes an underrun prevention member of which the cross section has an angular U shape or a rounded U shape. The underrun prevention member is disposed so as to straddle an upper end of a rectangular bumper beam, and each of angular U-shaped opening edges is integrally welded to an outer side wall and an inner side wall of the bumper beam.

SUMMARY OF INVENTION

However, the device described in the publication No. 2009-1199 has a complicated structure, so it is necessary for any portions of the device to be bent, overlapped with each other and connected to each other in the device. Thus, manufacturing cost of the device is increased. In the device described in the publication No. 2003-252134, if the bumper beam is deformed toward the inside of the vehicle due to a collision, a protruded end of the underrun prevention member may enter the inside of the vehicle beyond the bumper beam (refer to FIG. 2B), and there may be a high possibility that the underrun prevention member interferes with a vehicle component, such as a radiator, to damage the vehicle component.

The invention has been made under such circumstances, and it is an object of the invention to make it possible to easily manufacture, at low cost, an underrun prevention member that appropriately suppresses a damage to a vehicle component due to an underrun of the bumper beam under an object outside the vehicle or the object outside the vehicle under the bumper beam.

Means for Solving the Problems

To achieve the above object, the first aspect of the invention provides an underrun prevention member for a vehicle bumper beam including a substantially vertical outer side wall faced an area outside the vehicle and a horizontal wall provided so as to be extended substantially horizontally from an end of the outer side wall in a top-bottom direction toward an inside of the vehicle, disposed at a front portion or a rear portion of the vehicle so as to be extended substantially horizontally in a vehicle widthwise direction, and integrally fixed to the bumper beam so as to protrude in the top-bottom direction beyond the horizontal wall to prevent an underrun of the bumper beam under an object outside the vehicle or the object outside the vehicle under the bumper beam, the underrun prevention member comprising: (a) a vertical plate portion integrally fixed to the outer side wall so as to be in surface contact with the outer side wall, protruding in the top-bottom direction beyond the horizontal wall by a predetermined protrusion length, and having a predetermined width in the vehicle widthwise direction; (b) a reinforcement plate portion integrally provided to be continuous with a protruded end of the vertical plate portion, extending from the protruded end toward the inside of the vehicle so as to be bent at an angle in the underrun prevention member, and having a length thereof in a vehicle front-rear direction being shorter than a length of the horizontal wall in the vehicle front-rear direction; and (c) paired side plate portions integrally provided to be continuous with both ends of the reinforcement plate portion in the vehicle widthwise direction, extending from the both ends of the reinforcement plate portion toward outer sides in the vehicle widthwise direction, inclined so as to gradually approach the horizontal wall respectively, and integrally fixed to the horizontal wall at an outer end portion thereof, respectively.

The second aspect of the invention provides the underrun prevention member for a vehicle bumper beam recited in the first aspect of the invention, wherein each of the paired side plate portions includes a lateral inclined portion that is inclined in the top-bottom direction so as to gradually approach the horizontal wall, and a close contact portion that is parallel to the horizontal wall, and is in surface contact with the horizontal wall, and the close contact portion of each of the paired side plate portions is integrally fixed to the horizontal wall.

The third aspect of the invention provides the underrun prevention member for the vehicle bumper beam recited in the first or second aspect of the invention, wherein (a) the vertical plate portion has a length in the vehicle widthwise direction such that the vertical plate portion reaches outer edges of the paired side plate portions and is integrally connected to the paired side plate portions and the reinforcement plate portion over an entire length of the vertical plate portion in the vehicle widthwise direction, and the underrun prevention member has a substantially L-shaped cross section over the entire length of the underrun prevention member in the vehicle widthwise direction; and (b) the underrun prevention member is integrally formed by subjecting a sheet of metal plate material to press forming, entirely.

Effects of the Invention

The above underrun prevention member for a vehicle bumper beam includes the vertical plate portion that is integrally fixed to the outer side wall of the bumper beam; the reinforcement plate portion that is integrally provided to be continuous with the protruded end of the vertical plate potion; and the paired side plate portions that are integrally provided to be continuous with both ends of the reinforcement plate portion in the vehicle widthwise direction, and are integrally fixed to the horizontal walls of the bumper beam. Then, the underrun of the bumper beam under an object outside the vehicle or the object outside the vehicle under the bumper beam is prevented by the vertical plate portion that protrudes in the top-bottom direction beyond the horizontal walls. The reinforcement plate portion, which extends from the vertical plate portion toward the inside of the vehicle, is provided at the protruded end of the vertical plate portion. Thus, stiffness of the underrun prevention member is increased. In addition, the paired side plate portions provided at the both ends of the reinforcement plate portion are integrally fixed to the horizontal wall of the bumper beam, respectively. Thus, deformation of the vertical plate portion and the reinforcement plate portion is suppressed, and an underrun is further appropriately prevented. In this case, the reinforcement plate portion is shorter than the horizontal walls. Thus, when the bumper beam is deformed toward the inside of the vehicle, there is a low possibility that the reinforcement plate portion enters the inside of the vehicle beyond the bumper beam and then interferes with the vehicle component, such as a radiator, to damage the vehicle component.

In addition, the underrun prevention member, which includes the vertical plate portion, the reinforcement plate portion, and the paired side plate portions, is easily formed by subjecting a sheet of metal plate material to bending, drawing, or the like, through pressing. Thus, the underrun prevention member is easily manufactured at low cost as compared with the device described in JP-A-2009-1199 in which the portions are overlapped with each other and connected to each other.

In addition, in the second aspect of the invention, each of the paired side plate portions includes the lateral inclined portion and the close contact portion, and each close contact portion is integrally fixed to the horizontal wall of the bumper beam. Thus, the fixing strength of the side plate portions fixed to the bumper beam is increased, then the stiffness of the underrun prevention member is increased, and the underrun prevention member is tightly fixed to the bumper beam. This makes it possible to further appropriately prevent an underrun.

In addition, in the third aspect of the invention, the vertical plate portion has a length in the vehicle widthwise direction such that the vertical plate portion reaches the outer edges of the paired side plate portions, and is integrally connected to the reinforcement plate portion and the paired side plate portions over the entire length of the vertical plate portion in the vehicle widthwise direction, so that the underrun prevention member has a substantially L-shaped cross section over the entire length of the underrun prevention member in the vehicle widthwise direction. Therefore, the stiffness of the underrun prevention member is increased, and the underrun of the bumper beam under an object outside the vehicle or the object outside the vehicle under the bumper beam is further appropriately prevented. In addition, the paired side plate portions are inclined so as to gradually approach the horizontal wall. Thus, press workability is improved. The underrun prevention member is integrally formed by subjecting a sheet of metal plate material to press forming (drawing or the like) entirely. Thus, the underrun prevention member 10 is easily manufactured at low cost.

BRIEF DESCRIPTION OF DRAWINGS

The features, advantages, and technical and industrial significance of this invention will be described below with reference to the accompanying drawings, in which like numerals denote like elements, and wherein:

FIG. 1A is a plan view that shows the vehicle bumper beam disposed at the front portion of a vehicle together with a bather (collision object). FIG. 1B is an enlarged cross-sectional view taken along the line IB-IB in FIG. 1A, and FIG. 1C is a perspective view that shows a center portion of the bumper beam, to which an underrun prevention member is attached;

DETAILED DESCRIPTION OF EMBODIMENTS

Figure 1A:
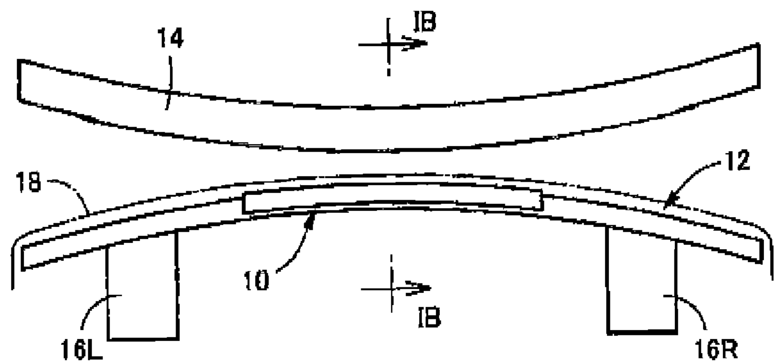
FIG. 1A to FIG. 1C are views that illustrate an example of a vehicle bumper beam to which the invention is applied.

A vehicle bumper beam according to the invention may be applied to both of a bumper attached to a front side of a vehicle and a bumper attached to a rear side of the vehicle. However, the vehicle bumper beam may be applied to only any one of them. The bumper beam functions as a reinforcement member or an attachment member for a bumper. For example, the bumper beam is integrally fixed to a side member or the like via a crash box (impact absorbing member) or the like, and a bumper body made of synthetic resin or the like is integrally attached to the bumper beam.

For example, in the case of the bumper beam for a front bumper, it is desirable that the shape of the bumper beam in the longitudinal direction, that is, the plan-view shape of the bumper beam seen from above the vehicle, should be smoothly curved such that a center portion is protruded forward. However, it is possible to employ various forms. For example, the shape may be substantially linear or may be inclined or curved rearward at only both end portions. For example, the plan-view shape of the underrun prevention member is determined to be a curved shape or the like, according to the shape of the bumper beam.

It is widely-known that a bumper beam, for example, has an angular cylindrical shape having a cross section of a rectangular shape or the like, which is constituted of horizontal walls provided at both of upper and lower sides of an outer side wall. However, it is possible to employ various forms. For example, it is possible to employ a bumper beam with a B-shaped cross section, which includes paired angular cylindrical portions provided at upper and lower sides and spaced apart from each other. The underrun prevention member may be applied to various bumper beams each of which includes at least an outer side wall and a horizontal wall provided at least one of the upper end and the lower end of the outer side wall. For example, in the case of a front bumper beam of the vehicle, the outer side wall is a front wall located at the front side of the vehicle. In the case of a rear bumper beam of the vehicle, the outer side wall is a rear wall located at the rear side of the vehicle. The horizontal wall provided so as to be continuous with the upper end of the outer side wall is an upper wall, and the horizontal wall provided so as to be continuous with the lower end of the outer side wall is a lower wall.

For example, the underrun prevention member is provided so as to protrude upward beyond the bumper beam and is configured to prevent the bumper beam from underrunning a collision object. However, the underrun prevention member may be provided so as to protrude downward beyond the bumper beam and may be configured to prevent a collision object from underrunning the bumper beam. Paired underrun prevention members may be provided at upper and lower sides of the bumper beam, respectively. In addition, only a single underrun prevention member may be provided at a center portion or the like of the bumper beam in the vehicle widthwise direction. A plurality of underrun prevention members may be provided successively or at predetermined intervals in the vehicle widthwise direction.

For example, when the upper wall is provided as the horizontal wall, a vertical plate portion has a vertical length such that the upper end of the vertical plate portion protrudes upward beyond the upper wall. The lower edge of the vertical plate portion is integrally welded to the outer side wall of the bumper beam, for example, by arc welding or the like. When the lower wall is provided as the horizontal wall, a vertical wall portion has a vertical length such that the lower end of the vertical wall portion protrudes downward beyond the lower wall. The upper edge of the vertical plate portion is integrally welded to the outer side wall of the bumper beam, for example, by arc welding or the like. The welding is performed continuously in the entire length of the lower edge or the upper edge of the vertical plate portion extending in the vehicle widthwise direction, or intermittently at predetermined intervals. The right and left edges of the vertical plate portion, which are located at both ends in the vehicle widthwise direction, may be welded to the outer side wall of the bumper beam by arc welding or the like. In addition, if possible, other welding means, such as spot welding, may be employed, or fixing means other than welding, such as a rivet, may be employed.

When paired side plate portions are fixed to the horizontal wall of the bumper beam as well, for example, the outer edges of the side plate portions may be integrally welded to the horizontal wall by arc welding or the like. For example, when close contact portions are provided as in the second aspect of the invention, other welding means, such as spot welding, may be employed, or fixing means other than welding, such as a rivet, may be employed. When the outer edges of the side plate portions are welded to the horizontal wall, for example, the welding is performed continuously over the entire length of the outer edges extending in a vehicle front-rear direction. However, the welding may be performed intermittently at predetermined intervals.

A reinforcement plate portion extends from the vertical plate portion toward the inside of the vehicle so as to be bent at an angle in the underrun prevention member. Thus, the reinforcement plate portion has an advantageous effect of increasing stiffness against deformation of the vertical plate portion in the vehicle front-rear direction. The reinforcement plate portion is provided so as to extend at a substantially right angle with respect to the vertical plate portion, that is, the reinforcement plate portion is provided in substantially parallel with the horizontal wall of the bumper beam. However, the reinforcement plate portion may be inclined in a top-bottom direction at a predetermined angle, for example, within the range of approximately ±15°.

A connecting portion between the vertical plate portion and the reinforcement plate portion may be simply bent at a predetermined angle. Instead, a flattened front-rear inclined portion that is obliquely inclined or a convex curved portion that is smoothly curved may be provided at the connecting portion between the vertical plate portion and the reinforcement plate portion. In this case, when the underrun prevention member is formed by press forming using a sheet of metal plate material, the press formability is improved, and it is possible to further reduce manufacturing cost, for example, by employing low-cost metal plate material, and improving durability of a pressing die. The front-rear inclined portion is, for example, a flat inclined portion that is inclined at a predetermined angle, such as 45°, and the convex curved portion is, for example, a circular arc or the like that is smoothly connected to the vertical plate portion and the reinforcement plate portion.

In the second aspect of the invention, each of the side plate portions is formed to include a lateral inclined portion and a close contact portion. However, the close contact portion does not necessarily need to be provided when the first aspect of the invention is implemented. Each of the side plate portions may include only a lateral inclined portion. In this case, the outer edges of the lateral inclined portions, which contact the horizontal all of the bumper beam, may be integrally welded to the horizontal wall by arc welding or the like.

In the third aspect of the invention, the vertical plate portion has a length in the vehicle widthwise direction such that the vertical plate portion reaches the outer edges of the paired side plate portions, and the vertical plate portion is integrally connected to the paired side plate portions and the reinforcement plate portion over the entire length of the vertical plate portion in the vehicle widthwise direction. However, when other inventions are executed, for example, the vertical plate portion and the reinforcement plate portion may have substantially the same width in the vehicle widthwise direction, and the paired side plate portions may be provided so as to protrude from the reinforcement plate portion toward the outer sides in the vehicle widthwise direction.

Embodiments

Figure 1B:
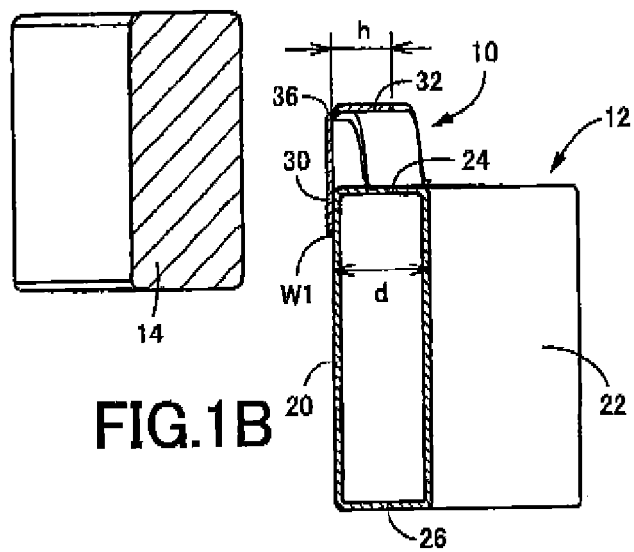
Figure 1C:
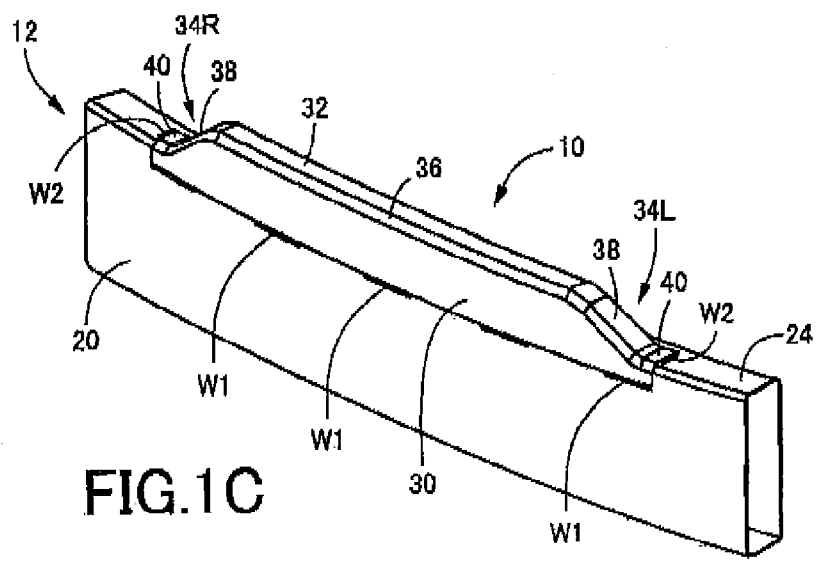

Hereafter, embodiments of the invention will be described in detail with reference to the accompanying drawings. FIG. 1A to FIG. 1C are views that illustrate a case where an underrun prevention member 10 is attached to a bumper beam 12 provided at the front portion of a vehicle, according to an embodiment of the invention. FIG. 1A is a plan view that shows the bumper beam 12 together with a barrier (collision object) 14, FIG. 1B is an enlarged cross-sectional view taken along the line IB-IB in FIG. 1A, and FIG. 1C is a perspective view of a center portion of the bumper beam 12, seen from a position diagonally ahead of and above the center portion, to which the underrun prevention member 10 is attached. The bumper beam 12 is integrally fixed to the front end portions of left and right side members 16L and 16R at positions near both left and right end portions of the bumper beam 12 via crash boxes (not shown) or the like, by bolts or the like. The bumper beam 12 is disposed in a position such that the bumper beam 12 extends substantially horizontally in the vehicle widthwise direction, and a bumper body 18 made of synthetic resin or the like is integrally attached to the bumper beam 12. The bumper beam 12 functions as a reinforcement (reinforcement member) and an attachment member for a bumper. The bumper beam 12 is, for example, formed of high tensile steel plate. In the embodiment, the bumper beam 12 has an angular cylindrical shape, and has a rectangular cross section that is long in the top-bottom direction. The bumper beam 12 integrally includes a front wall 20 and a rear wall 22 that are substantially vertical, and an upper wall 24 and a lower wall 26 that are substantially horizontal. The upper wall 24 connects upper end portions of the front wall 20 and rear wall 22, and the lower wall 26 connects lower end portions of the front wall 20 and rear wall 22. In the plan view shown in FIG. 1A, the center portion of the bumper beam 12 in the right-left direction (longitudinal direction) has a smoothly curved shape that protrudes forward. The front wall 20 corresponds to a substantially vertical outer side wall that faces an area outside the vehicle, and each of the upper wall 24 and the lower wall 26 corresponds to a horizontal wall.

The underrun prevention member 10 is integrally axed to the bumper beam 12 so as to protrude upward beyond the bumper beam 12. The underrun prevention member 10 prevents occurrence of a situation where the bumper beam 12 underruns the barrier 14, that is, the barrier 14 runs onto the bumper beam 12 to damage a vehicle component, such as a radiator, through interference with the vehicle component. The underrun prevention member 10 is disposed bilaterally symmetrically with a predetermined width at the center portion of the bumper beam 12 in the vehicle widthwise direction.

The underrun prevention member 10 includes a vertical plate portion 30 that is integrally fixed to the front wall 20 of the bumper beam 12 so as to be in surface contact with the front wall 20 of the bumper beam 12; a reinforcement plate portion 32 that extends at a substantially right angle from a protruded end of the vertical plate portion 30, which protrudes upward beyond the upper wall 24, toward the inside (rear side) of the vehicle; and paired side plate portions 34L and 34R that are integrally provided so as to be continuous with the both ends of the reinforcement plate portion 32 in the vehicle widthwise direction, and so as to extend from the both ends of the reinforcement plate portion 32 toward the outer sides in the vehicle widthwise direction, respectively. The vertical plate portion 30 protrudes upward beyond the upper wall 24 by a predetermined protrusion length and has a predetermined width in the vehicle widthwise direction. For example, the protrusion length and the width are appropriately set in consideration of the height, width, and the like of the vehicle component, such as a radiator, to be protected. The vertical plate portion 30 is also curved along the front wall 20 of the bumper beam 12 so that the lower end of the vertical plate portion 30 is in close contact with the front wall 20 over the entire length of the lower end in the vehicle widthwise direction. In addition, the lower edge of the vertical plate portion 30, which extends in the vehicle widthwise direction, is integrally welded to the front wall 20 by fillet welding, such as arc welding. Welded portions W1 in FIG. 1B and FIG. 1C are portions at which the lower edge of the vertical plate portion 30 is welded to the front wall 20. In the embodiment, the lower edge of the vertical plate portion 30 is intermittently welded to the front wall 20 at predetermined intervals in the vehicle widthwise direction.

Figure 2A:
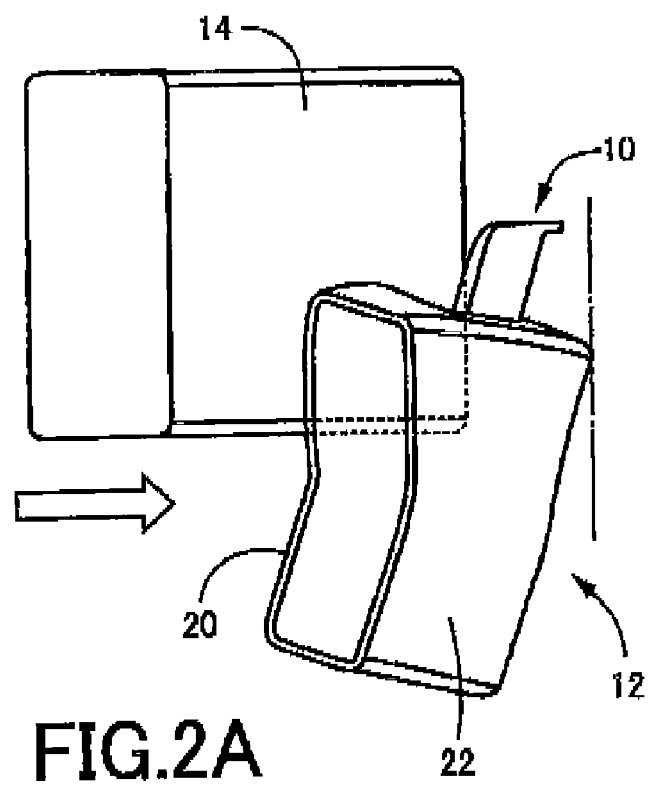
FIG. 2A is a side view seen from the left side of the vehicle which shows that the bumper beam according to the invention is deformed due to a collision with the barrier.
Figure 2B:
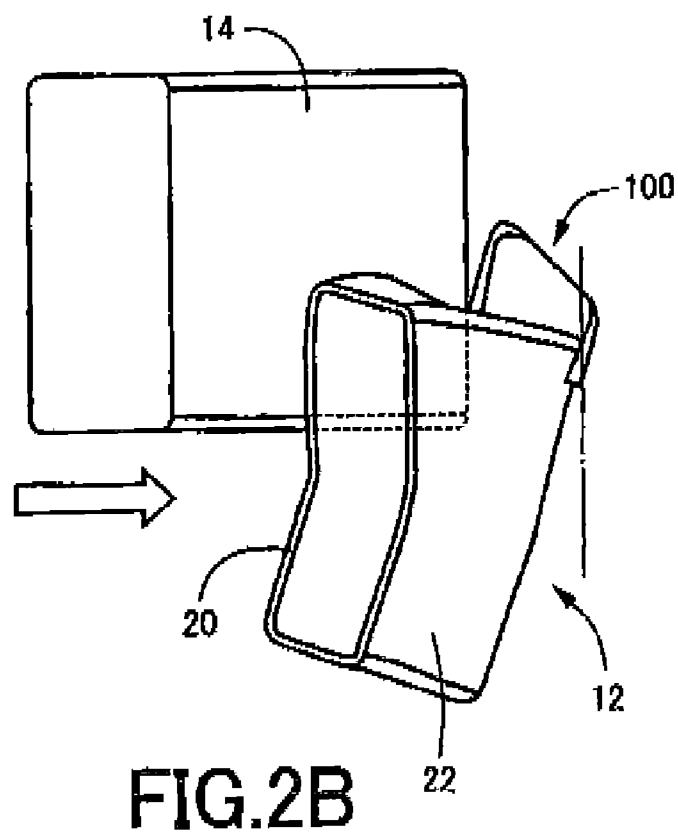
FIG. 2B is a side view seen from the left side of the vehicle which shows that a bumper beam according to related art is deformed due to a collision with the barrier.

The reinforcement plate portion 32 extends toward the rear side of the vehicle in substantially parallel with the upper wall 24 of the bumper beam 12. An extending length h of the reinforcement plate portion 32, by which the reinforcement plate portion 32 extends from the vertical plate portion 30 toward the rear side of the vehicle, is shorter than the width d of the upper wall 24. Thus, for example, as shown in FIG. 2A, when the bumper beam 12 relatively collides with the barrier 14 and is deformed, entry of the underrun prevention member 10 into the inside of the vehicle is suppressed. That is, in the case where an underrun prevention member 100 having an angular U-shape cross section is disposed so as to straddle the upper end portion of the bumper beam 12 and each of the opening ends thereof at both sides is integrally fixed to the front and rear walls 20 and 22 of the bumper beam 12 as shown in FIG. 2B, when the bumper beam 12 is deformed, the protruded end of the underrun prevention member 100 enters the inside of the vehicle beyond the bumper beam 12, and there may be a high possibility that the underrun prevention member 100 interferes with the vehicle component, such as a radiator, to damage the vehicle component. In contrast to this, in the underrun prevention member 10 according to the embodiment, the reinforcement plate portion 32 is provided on the vertical plate portion 30 at the front side in a cantilever manner, and the extending length h is shorter than the width d of the upper wall 24. Thus, entry of the underrun prevention member 10 into the inside of the vehicle is suppressed, and a damage to the vehicle component is further appropriately suppressed. In addition, the reinforcement plate portion 32 is connected to the vertical plate portion 30 via a flattened front-rear inclined portion 36 with a small width, which is inclined at an angle of approximately 45°. Thus, formability is improved when the reinforcement plate portion 32 is formed so as to extend at an angle with respect to the vertical plate portion 30 by bending or drawing through pressing.

The paired side plate portions 34L and 34R are formed symmetrically. Each of the side plate portions 34L and 34R includes a lateral inclined portion 38 that is inclined downward so as to gradually approach the upper wall 24 in a direction from the reinforcement plate portion 32 toward the outer side in the vehicle widthwise direction; and a close contact portion 40 that is parallel to the upper wall 24 and is in close contact with the upper wall 24. The outer edge of each close contact portion 40 extends in the vehicle front-rear direction, and is integrally welded to the upper wall 24 by fillet welding, such as arc welding. Welded portions W2 in FIG. 1C are portions at which the outer edges of the close contact portions 40 are welded to the upper wall 24. In the embodiment, the outer edge of each close contact portion 40 is welded to the upper wall 24 over the entire length of the outer edge in the vehicle front-rear direction.

The vertical plate portion 30 has a length in the vehicle widthwise direction such that the vertical plate portion 30 reaches the outer edges of the paired side plate pardons 34L and 34R, and is integrally connected to the paired side plate portions 34L and 34R and the reinforcement plate portion 32 over the entire length of the vertical plate portion 30 in the vehicle widthwise direction. Thus, the underrun prevention member 10 has a substantially L-shaped cross section over the entire length of the underrun prevention member 10 in the vehicle widthwise direction. Thus, in the underrun prevention member 10 according to the embodiment, the vertical plate portion 30 is integrally connected to the reinforcement plate portion 32 and the paired side plate portions 34L and 34R over the entire length of the vertical plate portion 30 in the vehicle widthwise direction. The underrun prevention member 10 is integrally formed entirely by subjecting a sheet of metal plate material to bending, drawing, or the like, through pressing. Thus, the underrun prevention member 10 can be manufactured easily at low cost. For example, a high tensile steel plate having a tension substantially equal to that of the bumper beam 12 is preferably used as the metal plate material.

The above underrun prevention member 10 according to the embodiment includes the vertical plate portion 30 that is integrally welded to the front wall 20 of the bumper beam 12; the reinforcement plate portion 32 that is integrally provided to be continuous with the protruded end of the vertical plate portion 30; and the paired side plate portions 34L and 34R that are integrally provided to be continuous with both ends of the reinforcement plate portion 32 in the vehicle widthwise direction, and are integrally welded to the upper wall 24 of the bumper beam 12. An underrun of the bumper beam 12 is prevented by the vertical plate portion 30 that protrudes upward beyond the upper wall 24.

The reinforcement plate portion 32, which extends at the substantially right angle from the vertical plate portion 30 toward the inside of the vehicle, is provided at the protruded end of the vertical plate portion 30. Thus, stiffness is increased. In addition, each of the paired side plate portions 34L and 34R provided at both ends of the reinforcement plate portion 32, is integrally welded to the upper wall 24 of the bumper beam 12. Thus, deformation of the vertical plate portion 30 and the reinforcement plate portion 32 is suppressed, and an underrun of the bumper beam 12 is further appropriately prevented. In this case, the extending length h of the reinforcement plate portion 32 toward the rear side of the vehicle is shorter than the width d of the upper wall 24. Thus, as shown in FIG. 2A, when the bumper beam 12 relatively collides with the barrier 14 and is deformed toward the inside of the vehicle, there becomes a low possibility that the reinforcement plate portion 32 enters the inside of the vehicle beyond the bumper beam 12 and then interferes with the vehicle component, such as a radiator, to damage the vehicle component.

In addition, the underrun prevention member 10 according to the embodiment, which includes the vertical plate portion 30, the reinforcement plate portion 32, and the paired side plate portions 34L and 34R, can be easily formed by subjecting a sheet of metal plate material to bending, drawing, or the like, through pressing. Thus, the underrun prevention member 10 can be easily manufactured at low cost as compared with the case where any portions of the device are overlapped with each other and connected to each other, as in the device described in JP-A-2009-1199.

In addition, in the embodiment, each of the paired side plate portions 34L and 34R includes the lateral inclined portion 38 and the dose contact portion 40, and each close contact portion 40 is integrally welded to the upper wall 24 of the bumper beam 12. Thus, the fixing strength of the side plate portions 34L and 34R fixed to the bumper beam 12 is increased, the stiffness of the underrun prevention member 10 is increased, and the underrun prevention member 10 is tightly fixed to the bumper beam 12. This makes it possible to further appropriately prevent the underrun of the bumper beam 12.

In addition, in the embodiment, the vertical plate portion 30 has a length in the vehicle widthwise direction such that the vertical plate portion 30 reaches the outer edges of the paired side plate portions 34L and 34R, and is integrally connected to the reinforcement plate portion 32 and the paired side plate portions 34L and 34R over the entire length of the vertical plate portion 30 in the vehicle widthwise direction, so that the underrun prevention member 10 has a substantially L-shaped cross section over the entire length of the underrun prevention member 10 in the vehicle widthwise direction. Therefore, the stiffness of the underrun prevention member 10 is increased, and the underrun of the bumper beam 12 can be further appropriately prevented. In addition, the paired side plate portions 34L and 34R are inclined so as to gradually approach the upper wall 24. Thus, press workability is improved. The underrun prevention member 10 is integrally formed entirely by subjecting a sheet of metal plate material to press forming (drawing or the like). Thus, the underrun prevention member 10 is easily manufactured at low cost, and manufacturing cost is reduced.

In addition, in the embodiment, a front-rear inclined portion 36 is provided at the connecting portion between the vertical plate portion 30 and the reinforcement plate portion 32. Therefore, when the underrun prevention member 10 is formed by press forming using a sheet of metal plate material, the press formability is improved, and it is possible to further reduce manufacturing cost, for example, by employing low-cost metal plate material, and improving durability of a pressing die.

Figure 3A:
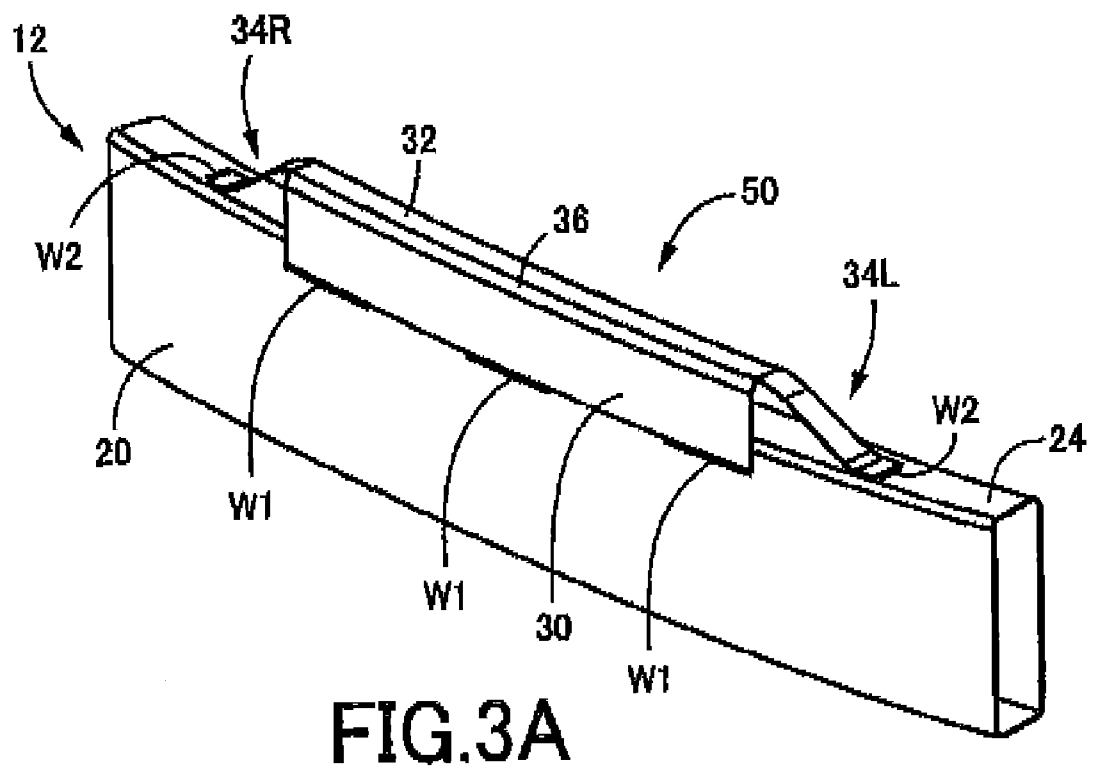
FIG. 3A and FIG. 3B are views that show second and third embodiments of the invention, and both are perspective views corresponding to FIG. 1C.

In the underrun prevention member 10 according to the above embodiment, the vertical plate portion 30 has a length in the vehicle widthwise direction such that the vertical plate portion 30 reaches the outer edges of the paired side plate portions 34L and 34R, and is integrally connected to the reinforcement plate portion 32 and the paired side plate portions 34L and 34R over the entire length of the vertical plate portion 30 in the vehicle widthwise direction. However, as in an underrun prevention member 50 shown in FIG. 3A, the vertical plate portion 30 and the reinforcement plate portion 32 may have substantially the same length in the vehicle widthwise direction, and the paired side plate portions 34L and 34R may be provided so as to protrude from the reinforcement plate portion 32 toward the outer sides in the vehicle widthwise direction. In this case, it is possible to reduce the weight of the underrun prevention member 50.

Figure 3B:
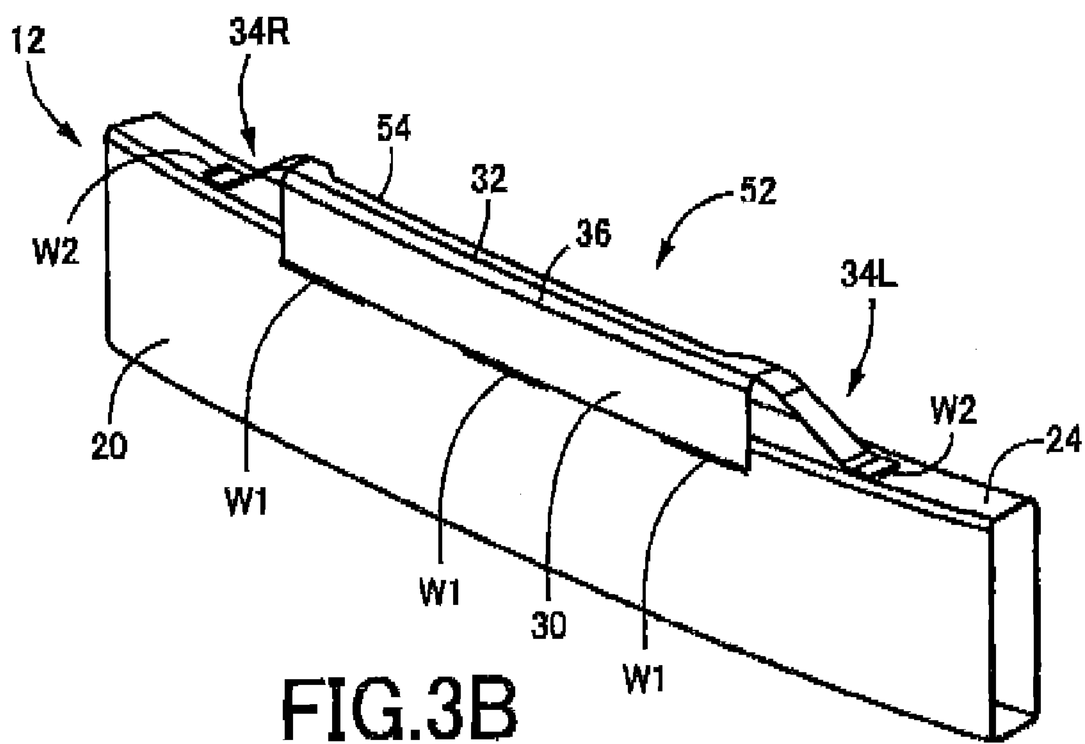

In an underrun prevention member 52 shown in FIG. 3B, as compared with the underrun prevention member 50, a cutout 54 is formed in the reinforcement plate portion 32 excluding both end portions of the reinforcement plate portion 32 in the vehicle widthwise direction, and the extending length h of the reinforcement plate portion 32 toward the rear side of the vehicle, is further reduced. In this case, the weight can be further reduced. In addition, as shown in FIG. 2A, when the bumper beam 12 relatively collides with the barrier 14 and is deformed toward the inside of the vehicle, entry of the underrun prevention member 52 toward the inside of the vehicle is further suppressed. This further reduces the possibility that the vehicle component is damaged.

Figure 4:
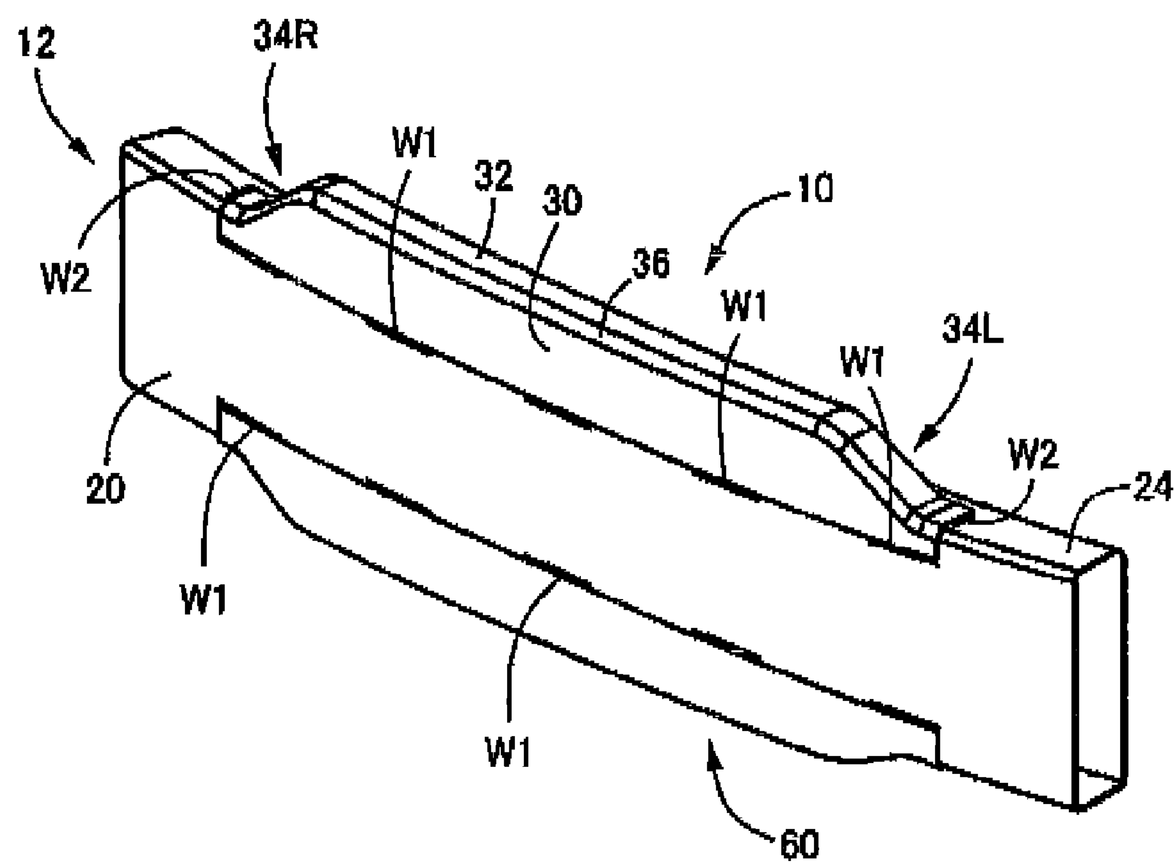
FIG. 4 is a view that shows a fourth embodiment of the invention, and is a perspective view corresponding to FIG. 1C.

FIG. 4 shows a case where, as compared with the embodiment shown in FIG. 1A to FIG. 1C, an underrun prevention member 60 that is configured to be vertically symmetrical to the underrun prevention member 10 is integrally welded to the lower side of the bumper beam 12 so as to be symmetrical to the underrun prevention member 10. The underrun prevention member 60 prevents occurrence of a situation where the barrier 14 underruns the bumper beam 12, that is, the bumper beam 12 runs onto the barrier 14 to damage the vehicle component, such as a radiator, through interference with the vehicle component. The configuration may be such that only the lower underrun prevention member 60 is attached instead of the upper underrun prevention member 10.

Although the embodiments of the invention have been described in detail with reference to the drawings, the embodiments are merely examples, and the invention can be implemented in various forms obtained by altering or modifying the embodiments based on the knowledge of those skilled in the art.

What is claimed is:

1. An underrun prevention member for a bumper beam fixed to a vehicle, the bumper beam including a substantially vertical outer side wall facing an area outside the vehicle and a horizontal wall provided so as to be extended substantially horizontally from an upper or lower end of the outer side wall toward the vehicle, the bumper beam being disposed at a front portion or a rear portion of the vehicle so as to be extended substantially horizontally in a vehicle widthwise direction, and the underrun prevention member being integrally fixed to the bumper beam so as to protrude upward or downward from the horizontal wall to prevent an underrun of the bumper beam under an object outside the vehicle or an underrun of the object outside the vehicle under the bumper beam, the underrun prevention member comprising:

a vertical plate portion integrally fixed to the outer side wall so as to be in surface contact with the outer side wall, protruding upward or downward from the horizontal wall by a predetermined protrusion length, and having a predetermined width in the vehicle widthwise direction;

a reinforcement plate portion integrally formed to be continuous with a protruding end of the vertical plate portion, the reinforcement plate portion extending from the protruding end toward the vehicle so that the underrun prevention member is bent at the protruding end, and the reinforcement plate portion having a length in a vehicle front-rear direction being shorter than a length of the horizontal wall in the vehicle front-rear direction; and a pair of side plate portions, each side plate portion being (1) integrally formed to be continuous with and to extend from both ends of the reinforcement plate portion in the vehicle widthwise direction, (2) inclined with respect to the horizontal wall so as to gradually approach the horizontal wall, and (3) integrally fixed to the horizontal wall at outer end portions of the underrun prevention member.

2. The underrun prevention member according to claim 1, wherein each of the pair of side plate portions includes a lateral inclined portion that is inclined with respect to the horizontal wall so as to gradually approach the horizontal wall, and a close contact portion that is parallel to the horizontal wall, and is in surface contact with the horizontal wall, and the close contact portion of each of the pair of side plate portions is integrally fixed to the horizontal wall.

3. The underrun prevention member according to claim 1, wherein the vertical plate portion has a length in the vehicle widthwise direction such that the vertical plate portion reaches outer edges of the pair of side plate portions, and is integrally connected to the pair of side plate portions and the reinforcement plate portion over an entire length of the vertical plate portion in the vehicle widthwise direction, and the underrun prevention member has a substantially L-shaped cross section over the entire length of the underrun prevention member in the vehicle widthwise direction; and the underrun prevention member is integrally formed by subjecting a sheet of metal plate material to press forming, entirely.

4. The underrun prevention member according to claim 2, wherein the vertical plate portion has a length in the vehicle widthwise direction such that the vertical plate portion reaches outer edges of the pair of side plate portions, and is integrally connected to the pair of side plate portions and the reinforcement plate portion over an entire length of the vertical plate portion in the vehicle widthwise direction, and the underrun prevention member has a substantially L-shaped cross section over the entire length of the underrun prevention member in the vehicle widthwise direction; and the underrun prevention member is integrally formed by subjecting a sheet of metal plate material to press forming, entirely.

* * * * *